(12) United States Patent
Singh et al.

(10) Patent No.: US 8,526,308 B1
(45) Date of Patent: Sep. 3, 2013

(54) INTERRUPTION OF WIRELESS REVERSE LINK DATA TRANSFER BASED ON POWER CHANGE INSTRUCTIONS

(75) Inventors: Jasinder Pal Singh, Olathe, KS (US); Sachin R. Vargantwar, Overland Park, KS (US); Manoj Shetty, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 371 days.

(21) Appl. No.: 12/836,367

(22) Filed: Jul. 14, 2010

(51) Int. Cl.
*G01R 31/08* (2006.01)

(52) U.S. Cl.
USPC .......................... 370/235; 370/522; 455/522

(58) Field of Classification Search
USPC ................. 370/235–238, 329–338, 389–427; 455/500–522
See application file for complete search history.

(56) References Cited

U.S. PATENT DOCUMENTS

| | | | |
|---|---|---|---|
| 6,493,541 B1 | 12/2002 | Gunnarsson et al. | |
| 7,346,034 B2 | 3/2008 | Takano et al. | |
| 7,480,516 B1 | 1/2009 | Chen et al. | |
| 7,480,517 B2 | 1/2009 | Gross et al. | |
| 2002/0093922 A1* | 7/2002 | Grilli et al. | 370/328 |
| 2006/0030351 A1* | 2/2006 | Miller et al. | 455/522 |
| 2007/0049317 A1 | 3/2007 | Qi et al. | |
| 2007/0207827 A1 | 9/2007 | Bi et al. | |
| 2008/0002602 A1 | 1/2008 | Chen et al. | |
| 2008/0039128 A1 | 2/2008 | Ostman et al. | |
| 2008/0043623 A1* | 2/2008 | Franceschini et al. | 370/235 |
| 2008/0207250 A1 | 8/2008 | Park et al. | |
| 2009/0092088 A1* | 4/2009 | Kokku et al. | 370/329 |
| 2010/0167780 A1* | 7/2010 | Lott et al. | 455/522 |

* cited by examiner

*Primary Examiner* — Ricky Ngo
*Assistant Examiner* — Iqbal Zaidi (57) ABSTRACT

What is disclosed is a method of operating a wireless communication device, where a wireless access node provides wireless access to communication services over a wireless link for the wireless communication device. The method includes transferring data in a series of frames to the wireless access node over a reverse link portion of the wireless link, where each frame comprises a series of subframes, and transferring a present frame at a first power level. The method also includes, during transfer of the present frame at the first power level, monitoring control information transferred by the wireless access node on a forward link portion of the wireless link, and in response to receiving a power change instruction in the control information, interrupting transfer of the subframes of a present frame at the first power level and restarting transfer of the subframes of the present frame at a second power level.

18 Claims, 6 Drawing Sheets

INTERRUPTION OF WIRELESS REVERSE LINK DATA TRANSFER BASED ON POWER CHANGE INSTRUCTIONS

TECHNICAL FIELD

Aspects of the disclosure are related to the field of communications, and in particular, data transfer over wireless links in wireless communication networks.

TECHNICAL BACKGROUND

Wireless communication systems provide wireless access to communication services for user devices, such as wireless communication devices. Typically, wireless communication systems include wireless access equipment, such as base stations and associated interconnection, backhaul, and control equipment, as a part of a wireless access system to provide the wireless access across a geographic area. Wireless communication devices allow users to establish communication sessions over a wireless link for communication with other devices, users, or systems.

Wireless links typically include forward link portions and reverse link portions for exchanging communications of the communication sessions between a wireless communication device and a wireless access node. These forward and reverse link portions may carry data or voice communications over different frequencies, timeslots, channels, or other portions of a wireless link, and each portion may include time-based subdivisions, such as frames, during which individual pieces of the communications are transferred to or from wireless communication devices. Frames could be further divided into subframes, which denote smaller subdivisions of a wireless link than a frame.

OVERVIEW

What is disclosed is a method of operating a wireless communication device, where a wireless access node provides wireless access to communication services over a wireless link for the wireless communication device. The method includes transferring data in a series of frames to the wireless access node over a reverse link portion of the wireless link, where each frame comprises a series of subframes, and transferring a present frame at a first power level. The method also includes, during transfer of the present frame at the first power level, monitoring control information transferred by the wireless access node on a forward link portion of the wireless link, and in response to receiving a power change instruction in the control information, interrupting transfer of the subframes of a present frame at the first power level and restarting transfer of the subframes of the present frame at a second power level.

What is also disclosed is a wireless communication device, where a wireless access node provides wireless access to communication services over a wireless link for the wireless communication device. The wireless communication device includes a transceiver configured to transfer data in a series of frames to the wireless access node over a reverse link portion of the wireless link, where each frame comprises a series of subframes. The transceiver is configured to transfer a present frame at a first power level. During transfer of the present frame at the first power level, a processing system of the wireless communication device is configured to monitor control information transferred by the wireless access node on a forward link portion of the wireless link. In response to receiving a power change instruction in the control information, the transceiver is configured to interrupt transfer of the subframes of a present frame at the first power level and restart transfer of the subframes of the present frame at a second power level.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
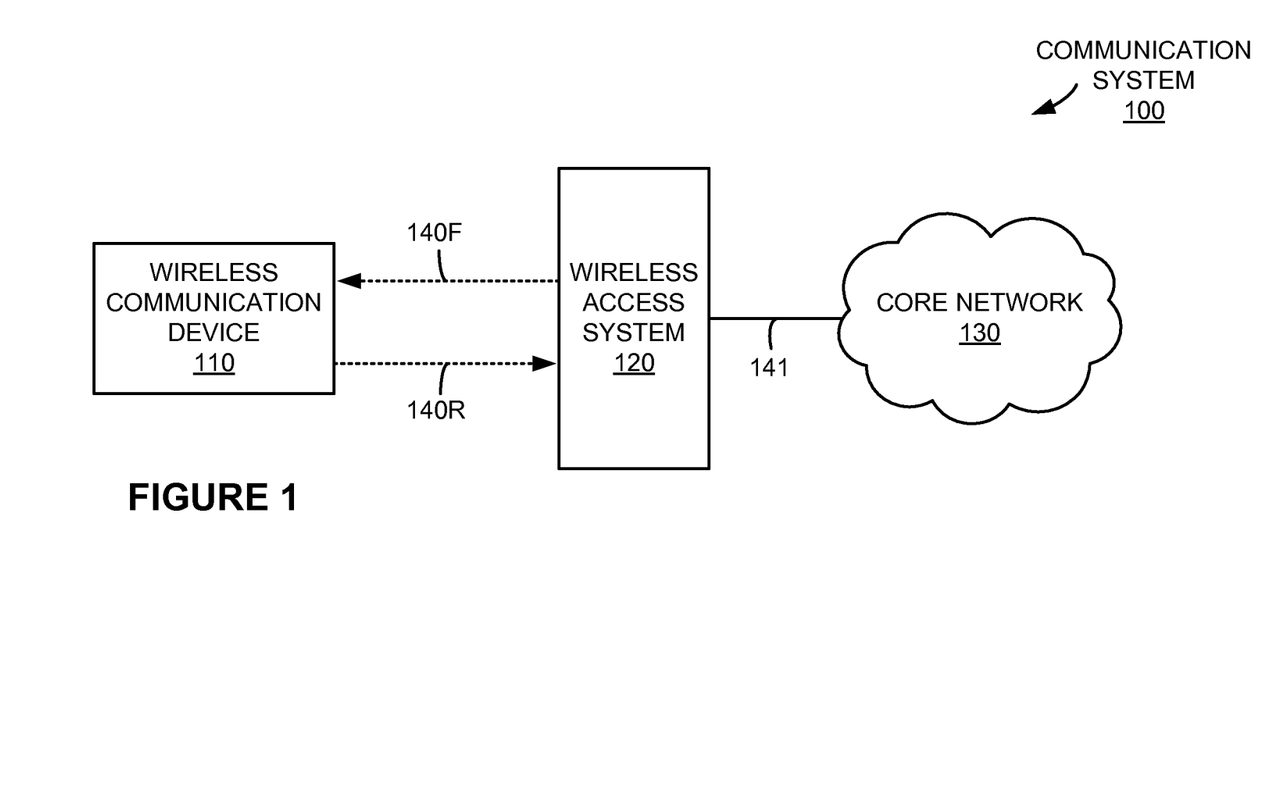
FIG. 1 is a system diagram illustrating a communication system.

FIG. 1 is a system diagram illustrating communication system 100. Communication system 100 includes wireless communication device 110, wireless access system 120, and core network 130. Wireless communication device 110 and wireless access system 120 communicate over wireless link 140. Wireless access system 120 and core network 130 communicate over link 141. In FIG. 1, wireless access system 120 provides wireless access to communication services over wireless link 140 for wireless communication device 110. Wireless link 140, in this example, includes forward link portion 140F and reverse link portion 140R, as illustrated by the dashed lines for wireless link 140 in FIG. 1. Forward link portion 140F, also referred to as a downlink, includes communications transferred by wireless access system 120. Reverse link portion 140R, also referred to as an uplink, includes communications transferred by wireless communication device 110.

Figure 2:
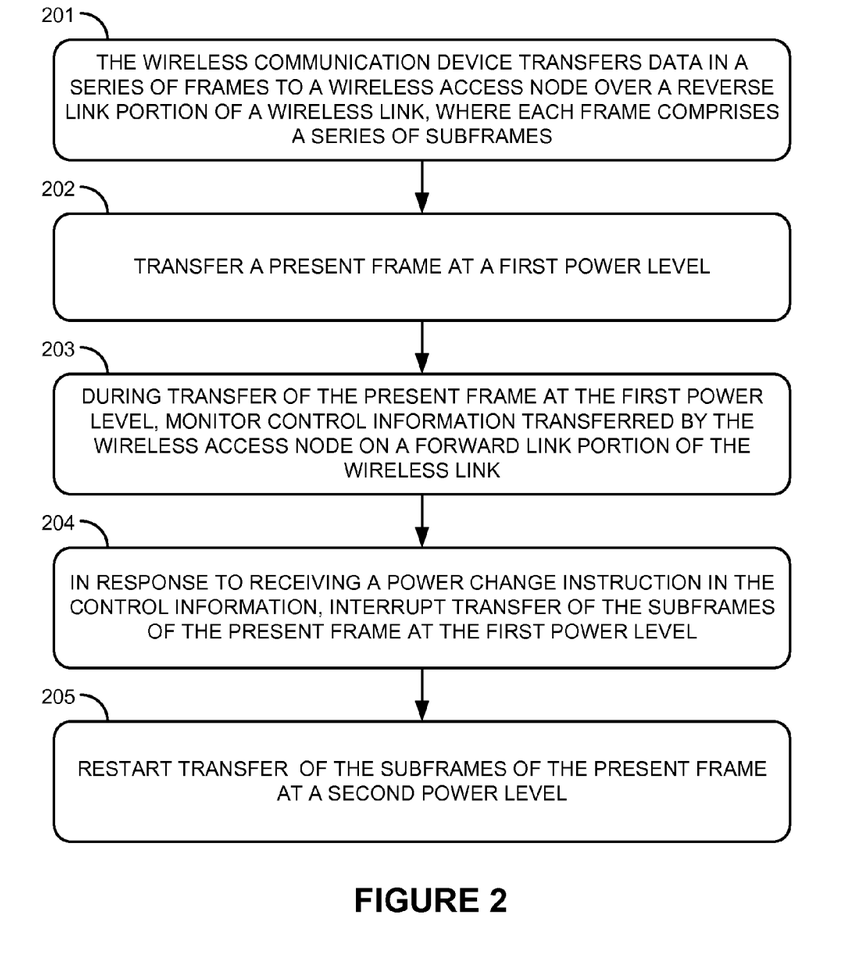
FIG. 2 is a flow diagram illustrating a method of operation of a wireless communication device.

FIG. 2 is a flow diagram illustrating a method of operating wireless communication device 110. The operations of FIG. 2 are referenced herein parenthetically. In FIG. 2, wireless communication device 110 transfers (201) data in a series of frames to wireless access system 120 over reverse link portion 140R of wireless link 140. In this example, each frame comprises a series of subframes, and the data is transferred within the subframes during each frame. The data could include user data, such as voice communications, web page data, file transfer data, among other data, or could include overhead communications such as control information. The frames and subframes sizes and contents typically include portions defined by the particular wireless communication protocol employed over wireless link 140.

During communication over wireless link 140 with wireless access system 120, wireless communication device 110 transfers (202) a present frame at a first power level. The present frame is transferred over reverse link portion 140R of wireless link 140. The first power level could include a default or initial power level used by wireless communication device 110 in the transfer of data to wireless access system 120. The first power level could be defined in decibels (dB), watts, a data transfer rate, bandwidth, spreading code selection, coding rate selection, among parameters.

During transfer of the present frame at the first power level, wireless communication device 110 monitors (203) control information transferred by wireless access system 120 on forward link portion 140F of wireless link 140. The control information, as transferred over forward link portion 140F, could include overhead information related to the maintenance and operation of wireless link 140. This overhead information could include control channels, channel assignments, frequency assignments, timeslot assignments, power control information such as power change instructions, reverse activity bit (RAB) information, network alerts, call alerts, text messages, among other overhead communications. Forward link portion 140F could also include user communications for transfer to wireless communication device 110.

In response to receiving a power change instruction in the control information, wireless communication device 110 interrupts (204) transfer of the subframes of the present frame at the first power level. The power change instruction could include an instruction to modify a power level used over reverse link portion 140R by wireless communication device 110. In some examples, the power change instruction includes a change in a reverse activity bit, which could include an instruction to increase a power level or decrease a power level. In other examples, the power change instruction includes an instruction to modify a data rate used over reverse link portion 140R by wireless communication device 110. The power change instruction could be a reverse noise alarm transferred by wireless access system 120 in response to a noise level of reverse link portion 140R as monitored by wireless access system 120, which could include monitoring a noise level associated with multiple wireless communication devices or reverse links. The power change instruction is monitored on forward link portion 140F of wireless link 140, while the data is concurrently transferred in frames over reverse link portion 140R of wireless link 140. The power change instruction could be received during the middle of the transfer of a frame or subframe. In response to the power change instruction received in the middle of the transfer of a frame or subframe, wireless communication device 110 halts transfer of the remainder of the frame or subframe in this example.

Wireless communication device 110 restarts (205) transfer of the subframes of the present frame at a second power level. In this example, restarting transfer of the subframes includes transferring the data of the associated frame again over reverse link portion 140R of wireless link 140. Also in this example, all of the subframes of the interrupted frame are retransferred at the second power level. The second power level could correspond to a parameter as discussed above for the first power level, and could include a higher or lower power level, data rate, or other parameter change.

In some examples, if the power change instruction is received during transfer of a final subframe of the present frame at the first power level, then wireless communication device 110 continues transfer of the final subframe of the present frame at the first power level, and changes to the second power level for transfer of subsequent frames. In further examples, if the power change instruction is received during transfer of a non-final subframe, or any subframe, of present frame at the first power level, then wireless communication device 110 interrupts transfer of the subframes of the present frame and restarts transfer of the subframes of the present frame at the second power level.

Figure 3:
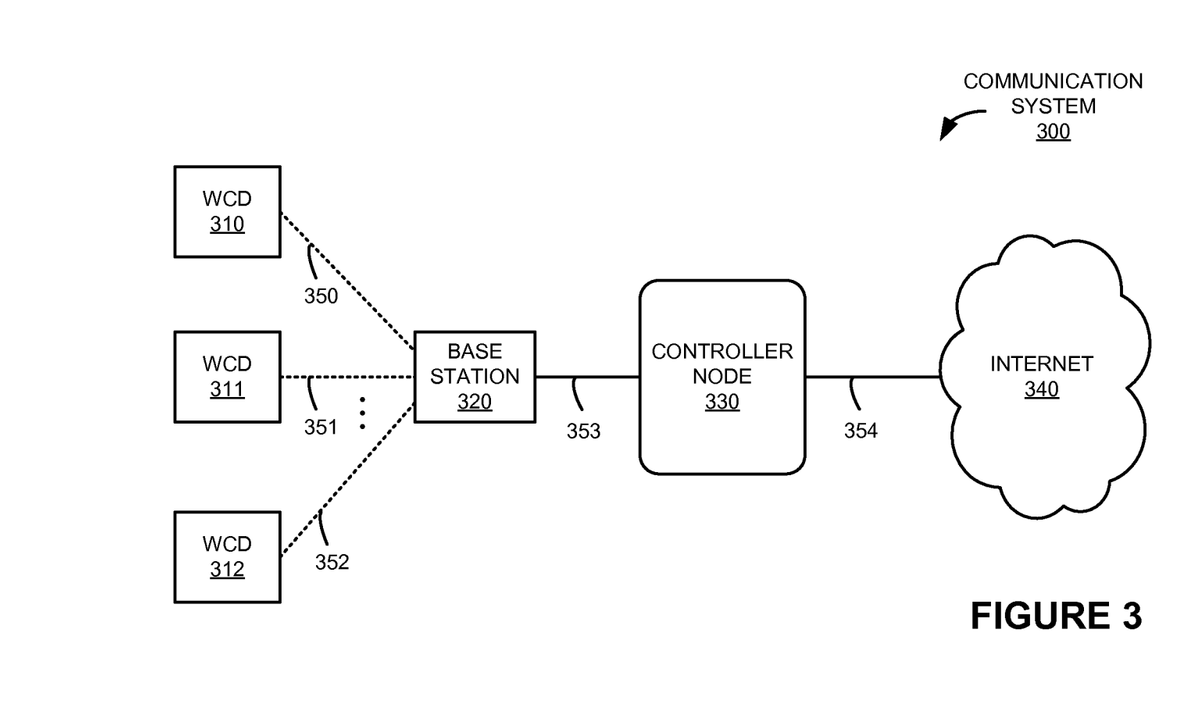
FIG. 3 is a system diagram illustrating a communication system.

FIG. 3 is a system diagram illustrating communication system 300. Communication system 300 includes wireless communication devices (WCD) 310-312, base station 320, controller node 330, and Internet 340. Wireless communication devices 310-312 communicate over wireless links 350-352, respectively, with base station 320. In this example, wireless communication devices 310-312 and base station 320 employ the Evolution-Data Optimized (EV-DO) wireless communication protocol over the associated wireless links 350-352. Base station 320 and controller node 330 communicate over backhaul link 353. In this example, backhaul link 353 is a T1 communication link capable of exchanging Internet protocol (IP) packets as well as overhead communications with controller node 330. Controller node 330 and Internet 340 communicate over metropolitan-area network link 354. In this example, link 354 is capable of exchanging Internet protocol (IP) packets with other equipment and systems over Internet 340. Although three wireless communication devices are shown in FIG. 3, it should be understood that a different number of wireless communication devices could be included.

Base station 320 includes transceiver equipment and an antenna, and could comprise base transceiver station equipment, an antenna tower, cabling, and communication interfaces for communicating with controller node 330. Controller node 330 could include a base station controller (BSC), radio node controller (RNC), routers, or other systems to route communications to/from Internet 340 over link 354 and control the operations of base station 320 over backhaul link 353. Internet 340 comprises routers, switches, and other packet handling equipment for routing IP communications. Internet 340 could also include a core network of a wireless communication provider.

In FIG. 3, base station 320 provides wireless access to communication services over wireless links 350-352 for each of wireless communication devices 310-312. Wireless links 350-352, in this example, each include forward link portions and reverse link portions, as illustrated by the dashed lines for wireless links 350-352 in FIG. 1. The forward link portions, also referred to as downlink, include communications transferred by base station 320. The reverse link portions, also referred to as uplink, include communications transferred by each of wireless communication devices 310-312. Although in this example, each of wireless communication devices 310-312 has a corresponding wireless link 350-352, in other examples, portions of the wireless links could be shared by wireless communication devices 350-352, such as a shared forward link and shared reverse link, where the links are channelized into frequency, timeslot, or spreading-code based channels, including combinations thereof.

Figure 4:
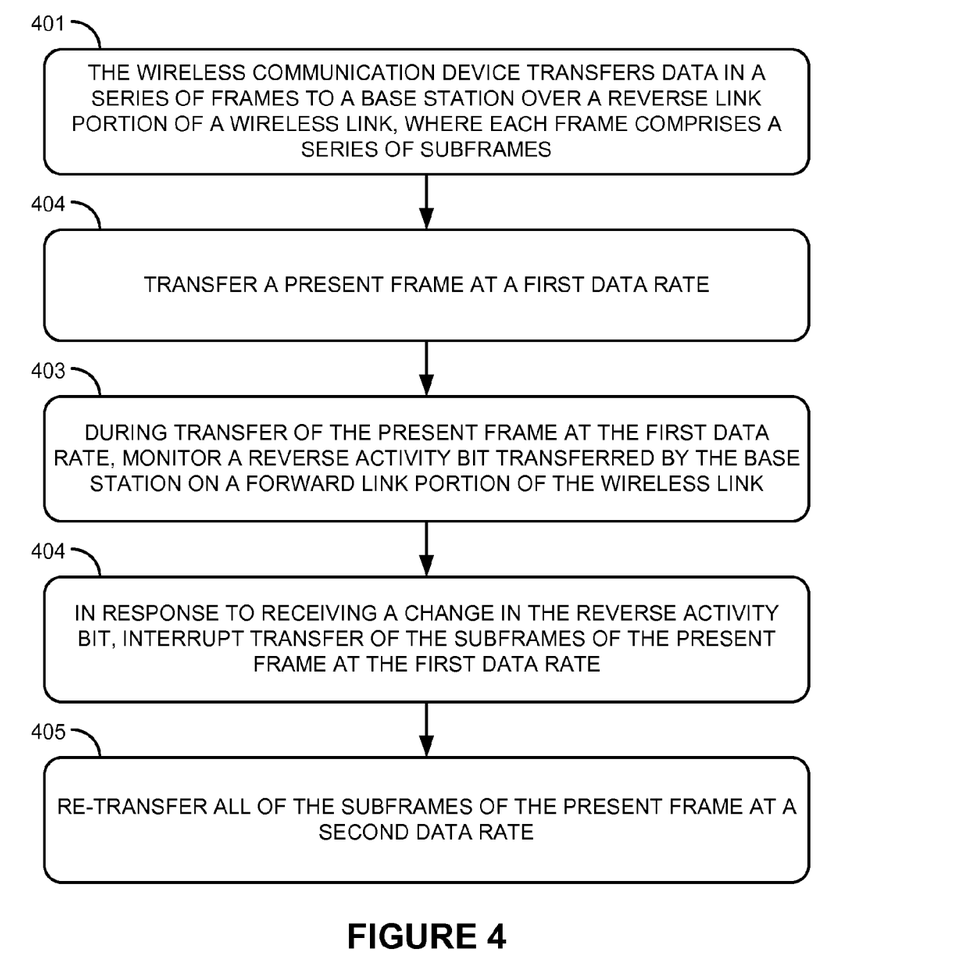
FIG. 4 is a flow diagram illustrating a method of operation of a wireless communication device.

FIG. 4 is a flow diagram illustrating a method of operation of communication system 300. The operations of FIG. 4 are referenced herein parenthetically. In FIG. 4, a wireless communication device, such as wireless communication device 310, transfers (401) data in a series of frames to base station 320 over a reverse link portion of wireless link 350, where each frame comprises a series of subframes. In this example, each frame includes a series of subframes, such as four subframes, and the data is transferred within the subframes during each frame. The frames are associated with user data in a present communication session, where the user data could include IP packets, voice-over IP (VoIP) packets, image data, voice data, or other user data. The data could also include overhead communications such as addressing information, error checking information, sequencing information, or other overhead information. The frames and subframes sizes, and associated data contents, typically include formatting as defined by the particular wireless communication protocol employed over wireless link 350, such as for EV-DO in this example.

During communication over wireless link 350 with base station 320, wireless communication device 310 transfers (402) a present frame of the present communication session at a first data rate. The present frame is transferred over the reverse link portion of wireless link 350. The first data rate could include a default or initial data rate used by wireless communication device 310 in the transfer of data to base station 320. During transfer of the present frame at the first data rate, wireless communication device 310 monitors (403) reverse activity bit (RAB) information transferred over a forward link portion of wireless link 350. In this example, the RAB information is monitored concurrent with the data transfer of the present frame. The RAB information could include a single bit of information, or could include multiple bits of information. The RAB information, as transferred over the forward link, could be accompanied by further overhead information related to the maintenance and operation of wireless link 350. This forward link overhead information could include control channels, channel assignments, frequency assignments, timeslot assignments, power control information such as power change instructions, network alerts, call alerts, text messages, among other overhead communications.

In response to receiving a change in the RAB information, wireless communication device 310 interrupts (404) transfer of the subframes of the present frame at the first data rate. The RAB information is monitored on a forward link portion of wireless link 350, during transfer of the data in the present frame over the reverse link portion of wireless link 350. The RAB information could be received during a mid-portion of the transfer of the present frame or an individual subframe portion of the present frame. In response to the change in the RAB information received in the midst of the transfer of a frame or subframe, wireless communication device 310 halts transfer of the present frame or subframe and any remaining subframes of the present frame. In this example, the present frame is interrupted without completing transfer of any currently transferring subframe.

Wireless communication device 310 re-transfers (405) all of the subframes of the present frame at a second data rate. In this example, re-transferring of the subframes includes transferring the data of the associated frame again over the reverse link portion of wireless link 350. Also in this example, all of the subframes of the interrupted frame are retransferred at the second data rate. A change in the RAB bit information could correspond to an increase or a decrease in the present data rate, and the second data rate could thus correspond to a different data rate than the first data rate. Further frames of the communication session are transferred at the second data rate by wireless communication device 310.

In some examples, such as when using the EV-DO wireless communication protocol, wireless communication device 310 is assigned a traffic channel portion of wireless link 350 for transferring data to base station 320 over a reverse link during a present communication session or portion of a present communication session. The frame could be an EV-DO layer 2 frame, which could include a media access control (MAC)-level data frame for the traffic channel assigned to the present communication session, where the frame is used for transferring user data over a wireless portion of a link between two endpoints, such as between transceiver equipment of wireless communication device 310 and base station 320 over wireless link 350.

Figure 5:
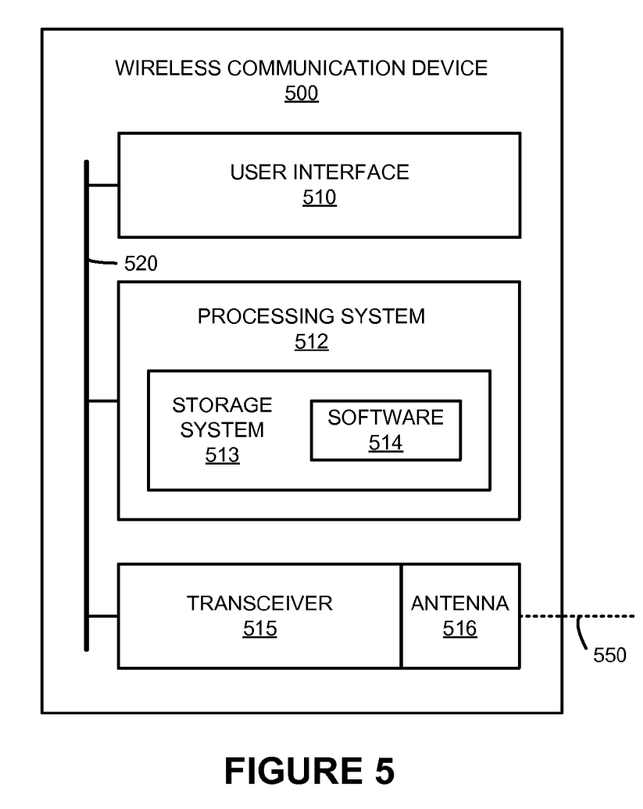
FIG. 5 is a block diagram illustrating a wireless communication device.

FIG. 5 is a block diagram illustrating wireless communication device 500, as an example of wireless communication device 110 found in FIG. 1 or wireless communication devices 310-312 found in FIG. 3, although wireless communication devices 110 and 310-312 could use other configurations. Wireless communication device 500 includes user interface 510, processing system 512, transceiver 515, and antenna 516. User interface 510, processing system 512, and transceiver 515 communicate over bus 520. Wireless communication device 500 may be distributed or consolidated among devices that together form elements 510, 512-516, and 520.

User interface 510 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 510 also includes equipment to communicate information to a user of wireless communication device 500. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Processing system 512 includes storage system 513. Processing system 512 retrieves and executes software 514 from storage system 513. Processing system 512 could incorporate a computer microprocessor, logic circuit, or some other processing device, and may be distributed among multiple processing devices. Storage system 513 could include computer-readable media such as disks, tapes, integrated circuits, servers, or some other memory device, and also may be distributed among multiple memory devices. Software 514 may include an operating system, logs, utilities, drivers, networking software, and other software typically loaded onto a computer system. Software 514 could contain an application program, firmware, or some other form of computer-readable processing instructions. When executed by processing system 512, software 514 directs wireless communication device 500 to operate as described herein, such as determine data for transfer over wireless link 550, monitor control information received by transceiver 515—including power change instructions, instruct transceiver 515 to interrupt transfer of data frames or subframes, and instruct transceiver 515 to restart transfer of data frames or subframes, among other operations.

Transceiver 515 comprises radio frequency (RF) communication circuitry. Transceiver 515 includes antenna 516 in this example. Transceiver 515 could also include amplifiers, filters, modulators, and signal processing circuitry. In this example, transceiver 515 can exchange instructions and information with processing system 512 over bus 520. Transceiver 515 also communicates with wireless access systems, such as base stations, omitted for clarity, through antenna 516 over wireless link 550, to access communication services and exchange communications of the communication services, receive control information, such as power change instructions, adjust a power of communication transfer, interrupt transfer of data frames or subframes, and restart transfer of data frames or subframes, among other operations.

Antenna 516 includes an antenna or antenna array, and could include additional circuitry such as impedance matching elements, physical structures, wires, or other elements. Antenna 516 can exchange RF communications with transceiver 515 and may include multiplexing circuitry. Antenna 516 could support wireless communications over multiple frequency spectrums, and could include separate antenna elements for each frequency spectrum, although other configurations could be employed. Antenna 516 allows for communication of wireless communication device 500 over wireless link 550.

Wireless link 550 could use various protocols or communication formats as described herein for wireless links 140 and 350-352, including combinations, variations, or improvements thereof. Bus 520 comprises a physical, logical, or virtual communication link, capable of communicating data, control signals, communications, and power, along with other information and signals. In some examples, bus 520 is encapsulated within any of elements 510 and 512-515, and may be a software or logical link. In other examples, bus 520 uses various communication media, such as air, space, metal, optical fiber, or some other signal propagation path, including combinations thereof. Bus 520 could be a direct link or might include various equipment, intermediate components, systems, and networks.

Figure 6:
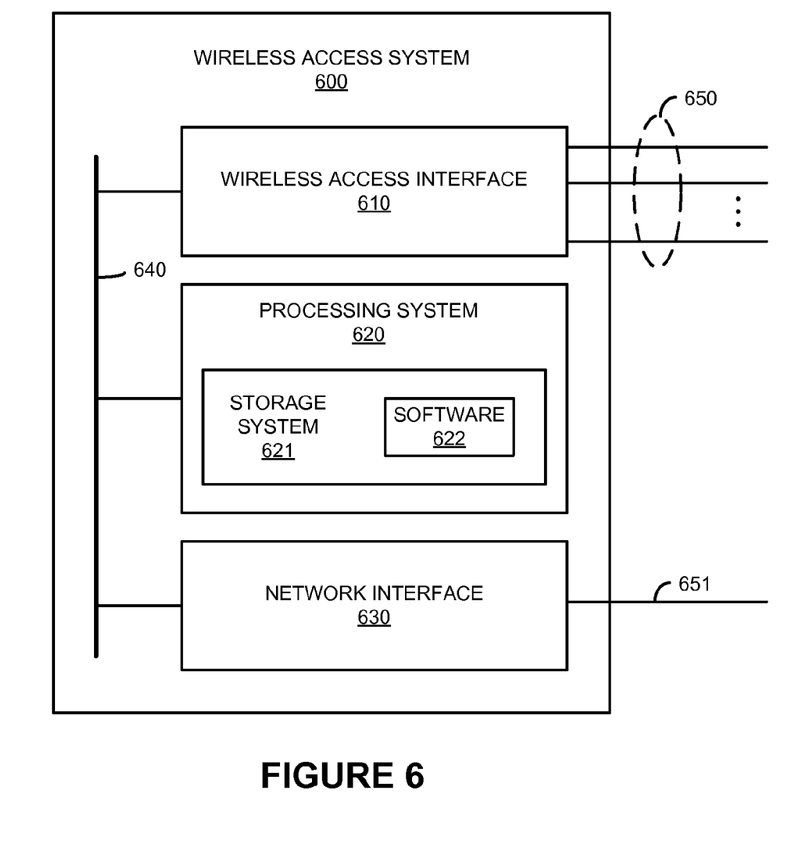
FIG. 6 is a block diagram illustrating a wireless access system.

FIG. 6 is a block diagram illustrating wireless access system 600, as an example of wireless access system 120 found in FIG. 1, or base station 320 or controller node 330 found in FIG. 3, although wireless access control 120, base station 320, or controller node 330 could use other configurations. Wireless access system 600 includes wireless access interface 610, processing system 620, and network interface 630. Wireless access interface 610, processing system 620, and network interface 630 communicate over bus 640. Wireless access system 600 may be distributed among multiple devices that together form elements 610, 620-622, 630, 640, and 650-651.

Wireless access interface 610 comprises communication interfaces for communicating with and controlling the operations of wireless communication devices or base stations over links 650. Wireless access interface 610 also receives command and control information and instructions from processing system 620 or network interface 630 for controlling the operations of wireless communication devices or base stations over links 650, exchanging handoff communications of wireless communication devices between base stations, determining power change instructions for transfer to wireless communication devices, and handling interrupted data transfer from wireless communication devices, among other operations. Links 650 could each use various protocols or communication formats as described herein for wireless link 140, wireless links 350-352, or link 353, including combinations, variations, or improvements thereof.

Processing system 620 includes storage system 621. Processing system 620 retrieves and executes software 622 from storage system 621. In some examples, processing system 620 is located within the same equipment in which wireless access interface 610 or network interface 630 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as provide wireless access for wireless communication devices, exchange handoff communications, determine control information—including power change instructions—for transfer to wireless communication devices, and handle interrupted data transfer from wireless communication devices, among other operations.

Network interface 630 comprises network router and gateway equipment for communicating with a core network of a wireless communication provider, such as with core network 130, controller node 330, or Internet 340. Network interface 630 exchanges user communications and overhead communications with a core network of a wireless communication system over link 651. Link 651 could use various protocols or communication formats as described herein for links 141, 353, or 354, including combinations, variations, or improvements thereof.

Bus 640 comprises a physical, logical, or virtual communication link, capable of communicating data, control signals, power, and communications, along with other information. In some examples, bus 640 is encapsulated within the elements of wireless access interface 610, processing system 620, or network interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to exchange communications of wireless communication services over wireless links with wireless access systems, request communication services, and receive control information from wireless access systems, among other operations. Wireless communication device 110 may also include user interface systems, memory devices, computer-readable storage mediums, software, processing circuitry, or other communication components. Wireless communication device 110 may be a user device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one wireless communication device is shown in FIG. 1, it should be understood that a different number of wireless communication devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access to communication services within different coverage areas to user devices such as wireless communication device 110 shown in FIG. 1, route user communications between core network 130 and wireless communication devices, or provide network information, handoff information, or configuration information to wireless communication devices, among other operations. Wireless access system 120 may also comprise data modems, routers, servers, memory devices, software, processing systems, cabling, network communication interfaces, physical structural supports, or other communication apparatuses. Wireless access system 120 may also comprise base stations, base transceiver stations (BTS), base station controllers (BSC), mobile switching centers (MSC), radio node controllers (RNC), or other communication equipment and apparatuses.

Core network 130 could include further wireless access systems, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access systems and associated equipment for providing communication services to many user devices across a geographic region.

Wireless link 140 uses the air or space as the transport media. Wireless link 140 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one wireless link 140 is shown in FIG. 1, it should be understood that this wireless link is merely illustrative to show communications with wireless access system 120.

Communication link 141 uses metal, glass, optical, air, space, or some other material as the transport media. Communication link 141 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 141 could be a direct links or may include intermediate networks, systems, or devices.

Links 140-141 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, wherein a wireless access node provides wireless access to communication services over a wireless link for the wireless communication device, the method comprising:
   transferring data in a series of frames to the wireless access node over a reverse link portion of the wireless link, wherein each frame comprises a series of subframes;
   transferring a present frame at a first power level;
   during transfer of the present frame at the first power level, monitoring control information transferred by the wireless access node on a forward link portion of the wireless link;
   in response to receiving a power change instruction in the control information during transfer of a final subframe of the present frame at the first power level, continuing transfer of the final subframe of the present frame at the first power level; and
   in response to receiving the power change instruction in the control information during transfer of a non-final subframe of present frame at the first power level, interrupting transfer of the subframes of the present frame and restarting transfer of the subframes of the present frame at a second power level.

2. The method of claim 1, further comprising:
   transferring the present frame at a first data rate; and
   in response to receiving the power change instruction in the control information, interrupting transfer of the subframes of the present frame at the first data rate and restarting transfer of the subframes of the present frame at a second data rate.

3. The method of claim 1, wherein the power change instruction comprises a reverse activity bit (RAB).

4. The method of claim 1, wherein the power change instruction comprises a reverse noise alarm.

5. The method of claim 1, wherein the second power is of a lower power than the first power.

6. The method of claim 1, wherein the second power is of a higher power than the first power.

7. The method of claim 1, wherein the frame comprises an Evolution Data-Optimized (EV-DO) layer 2 frame.

8. The method of claim 1, wherein the power change instruction is transferred by the wireless access node in response to a noise level of the reverse link as monitored by the wireless access node.

9. The method of claim 1, wherein interrupting transfer of the subframes of the present frame at the first power level comprises interrupting transfer of a currently transferring subframe of the present frame without completing transfer of the currently transferring subframe, and wherein restarting transfer of the subframes of the present frame at the second power level comprises transferring all of the subframes of the present frame at the second power level.

10. A wireless communication device, wherein a wireless access node provides wireless access to communication services over a wireless link for the wireless communication device, comprising:
   a transceiver configured to transfer data in a series of frames to the wireless access node over a reverse link portion of the wireless link, wherein each frame comprises a series of subframes;
   the transceiver configured to transfer a present frame at a first power level;
   during transfer of the present frame at the first power level, a processing system configured to monitor control information transferred by the wireless access node on a forward link portion of the wireless link;

in response to receiving a power change instruction in the control information during transfer of a final subframe of the present frame at the first power level, the transceiver is configured to continue transfer of the final subframe of the present frame at the first power level and transfer a subsequent frame at the second power level; and in response to receiving the power change instruction in the control information during transfer of a non-final subframe of present frame at the first power level, the transceiver is configured to interrupt transfer of the subframes of the present frame and restart transfer of the subframes of the present frame at a second power level.

11. The wireless communication device of claim 10, comprising:

the transceiver configured to transfer the present frame at a first data rate; and in response to receiving the power change instruction in the control information, the transceiver configured to interrupt transfer of the subframes of the present frame at the first data rate and restart transfer of the subframes of the present frame at a second data rate.

12. The wireless communication device of claim 10, wherein the power change instruction comprises a reverse activity bit (RAB).

13. The wireless communication device of claim 10, wherein the power change instruction comprises a reverse noise alarm.

14. The wireless communication device of claim 10, wherein the second power is of a lower power than the first power.

15. The wireless communication device of claim 10, wherein the second power is of a higher power than the first power.

16. The wireless communication device of claim 10, wherein the frame comprises an Evolution Data-Optimized (EV-DO) layer 2 frame.

17. The wireless communication device of claim 10, wherein the power change instruction is transferred by the wireless access node in response to a noise level of the reverse link as monitored by the wireless access node.

18. The wireless communication device of claim 10, wherein the transceiver is configured to interrupt transfer of a currently transferring subframe of the present frame without completing transfer of the currently transferring subframe to interrupt transfer of the subframes of the present frame at the first power level, and wherein the transceiver is configured to transfer all of the subframes of the present frame at the second power level to restart transfer of the subframes of the present frame at the second power level.

* * * * *